(12) United States Patent
Lee

(10) Patent No.: US 7,902,522 B2
(45) Date of Patent: Mar. 8, 2011

(54) SUBMERSIBLE PUMP WITH UV STERILIZATION DEVICE

(75) Inventor: Ming Yu Lee, Keelung (TW)

(73) Assignee: GMJ Design Group, LLC, Lake Worth, FL (US)

( * ) Notice: Subject to any disclaimer, the term of this patent is extended or adjusted under 35 U.S.C. 154(b) by 424 days.

(21) Appl. No.: 12/098,421

(22) Filed: Apr. 5, 2008

(65) Prior Publication Data
US 2008/0267831 A1   Oct. 30, 2008

(30) Foreign Application Priority Data

Apr. 26, 2007   (CN) .................. 2007 2 0119764 U

(51) Int. Cl.
*B01J 19/12* (2006.01)
(52) U.S. Cl. .............. 250/435; 250/436; 422/186.3
(58) Field of Classification Search .......... 250/435, 250/432 R, 436; 422/22, 24, 186.3
See application file for complete search history.

(56) References Cited

U.S. PATENT DOCUMENTS 5,124,131 A * 6/1992 Wekhof ............... 422/186.3
* cited by examiner

*Primary Examiner* — Kiet T Nguyen
(74) *Attorney, Agent, or Firm* — Jackson IPG PLLC; Demian K. Jackson

(57) ABSTRACT

A submersible pump with UV sterilization device includes a casing, at least one sterilization room and one water pump room provided in the casing, a first end cap and a second end cap separately fixed at the two ends of the casing, a front water inlet provided at the first end cap, a back water inlet connected to the water inlet of the sterilization room provided at the second end cap, and a reflection board provided at the internal wall of the sterilization room. A water pump is fixed in the water pump room, a water outlet is fixed above the impeller room of the water pump, the impeller room is connected to the water outlets of the sterilization room, a cold cathode UV sterilization device is provided in the sterilization room, the sterilization device is connected to the output end of an inverter fixed in the casing.

13 Claims, 4 Drawing Sheets

SUBMERSIBLE PUMP WITH UV STERILIZATION DEVICE

BACKGROUND OF THE INVENTION

1. Field of the Invention

The present invention involves a submersible pump, especially involves a submersible pump with UV sterilization device used in indoor and outdoor fountains or ponds.

2. Description of the Prior Art

Currently, the present devices for water cycle and ultraviolet (UV) sterilization mainly involve several kinds as below.

1. Commonly ultraviolet fluorescent lamps are fixed into the external filter device of a water pump, and they are activated by ballasts. This structure involves the disadvantages of big volume, possibly impacting the lamps during disassembly, assembly or cleaning, and the water temperature being influenced by the lamp heating.

2. Ordinary fluorescent ultraviolet lamps are directly set in the water lighting for sterilization, and then the water is cycled by water pumps. This device involves the disadvantages of low utilization ratio of ultraviolet lamp light and possibility hurting other objects and biology of the environments.

3. A fluorescent ultraviolet sterilization device is fixed into the part of rising pipe of the water pump. In this way, for the high speed of the water flow, the effect of sterilization is poor. And the device has a big volume, complicated structures and a complicated assembly and maintenance process.

SUMMARY OF THE INVENTION

The present invention is to solve the technical problem of providing a submersible pump with UV sterilization device. The submersible pump has a small volume, a compact structure, an easy way of assembly and disassembly, good effect of sterilization, long useful life and no hurts to the other objects and biology of the environments.

The present invention of a submersible pump with UV sterilization device, comprises:

a casing, at least one sterilization room and one water pump room being provided in the casing, a first end cap and a second end cap being separately fixed at the two ends of the casing, a front water inlet being provided at the position of the first end cap corresponding to the water pump room, a back water inlet connected to the water inlet of the sterilization room being provided at the second end cap, and a reflection board being provided at the internal wall of the sterilization room;

a water pump, the water pump comprising a pump casing, a stator fixed at the pump casing, a permanent-magnet rotor fixed in a rotor containing cavity of the pump casing through a rotating shaft, and an impeller in an impeller room driven by the permanent-magnet rotor, the water pump being provided in the water pump room of the casing, a water outlet being provided above the impeller room of the water pump, and the impeller room being connected to the water outlet of the sterilization room;

an inverter, the inverter being provided in a containing cavity in the casing; and a cold cathode UV sterilization device, the cold cathode UV sterilization device being fixed in the sterilization room of the casing and connected to the output end of the inverter;

when working, one part of the water being transmitted from the back water inlet of the second end cap into the sterilization room to have ultraviolet irradiation, the water flow after ultraviolet irradiation being transmitted from the outlet of the sterilization room into the impeller room of the water pump and then being mixed and pumped out with another part of the water transmitted from the front water inlet of the first end cap into the impeller room.

The present invention of submersible pump with UV sterilization device can further comprise a transparent spirality diversion component; a through hole is provided in the spirality diversion component, and spirality slots are provided at the outside wall of the spirality diversion component; and the spirality diversion component is fixed in the sterilization room in the casing, with the cold cathode UV sterilization device being inserted into its through hole, and with its outside edge being contacted to the internal wall of the sterilization room and the reflection board, to form a spirality water current passage in the sterilization room, to increase the distance of water flow, for increasing the time of the ultraviolet irradiation.

The cold cathode UV sterilization device comprises a transparent glass tube, a cold cathode UV lamp with a radiative light of 253.7 nm (nanometers) wavelength loaded in the glass tube, and a waterproof connector inserted to the nozzle of the glass tube and connected to the two electrodes of the cold cathode UV lamp.

The scale between the total area of all the back water inlets of the second end cap and the total area of all the front water inlets of the first end cap is from 10:90 to 50:50, so as to enable to adjust the scale of the water inflow needing sterilization from the back water inlet of the second end cap.

The present invention introduces a whole casing with a sterilization room and a water pump room inside, and a high efficiency cold cathode UV sterilization device. It has a compact structure, greatly decreasing the volume of the submersible pump; it has an easy way of assembly and disassembly, only needing to open the first and second end cap for installing and uninstalling all the components; it also has a long useful life; the cold cathode UV lamp is sealed in a transparent tube to form one component, easily to be changed.

Because the UV sterilization device is set in the sterilization room, and the reflection board is set in at the internal wall of the sterilization room, so it will do no hurts to the other objects and biology of the environment, and at the same time it can decrease the wastage of the UV lamp light without damages to the plastic casing of the water pump. The spirality diversion component fixed in the sterilization room forms a spirality water current passage, making the water flowing out along the spirality water current passage, increasing the time of the ultraviolet irradiation, and having good sterilization effect.

The UV lamp is driving with an electric inverter, when it is a short circuit at the two electrodes of the lamp, the high voltage end of the inverter forms a loop to make the high voltage disappear immediately. So when the water is into the lamps, the high voltage hurts will not appear, and at the same time it can avoid the ultraviolet being destroyed by the water accidentally getting into the lamp.

When the submersible pump is working, a scale of water after ultraviolet sterilization is mixed and pumped out with the main water current coming in from the front water inlet, so the flow is big, especially fitting to be used in indoor and outdoor fountains or ponds.

DESCRIPTION OF THE PREFERRED EMBODIMENT

Aspects of the present invention is best understood from the following detailed description when read with reference to the accompanying figures.

Figure 1:
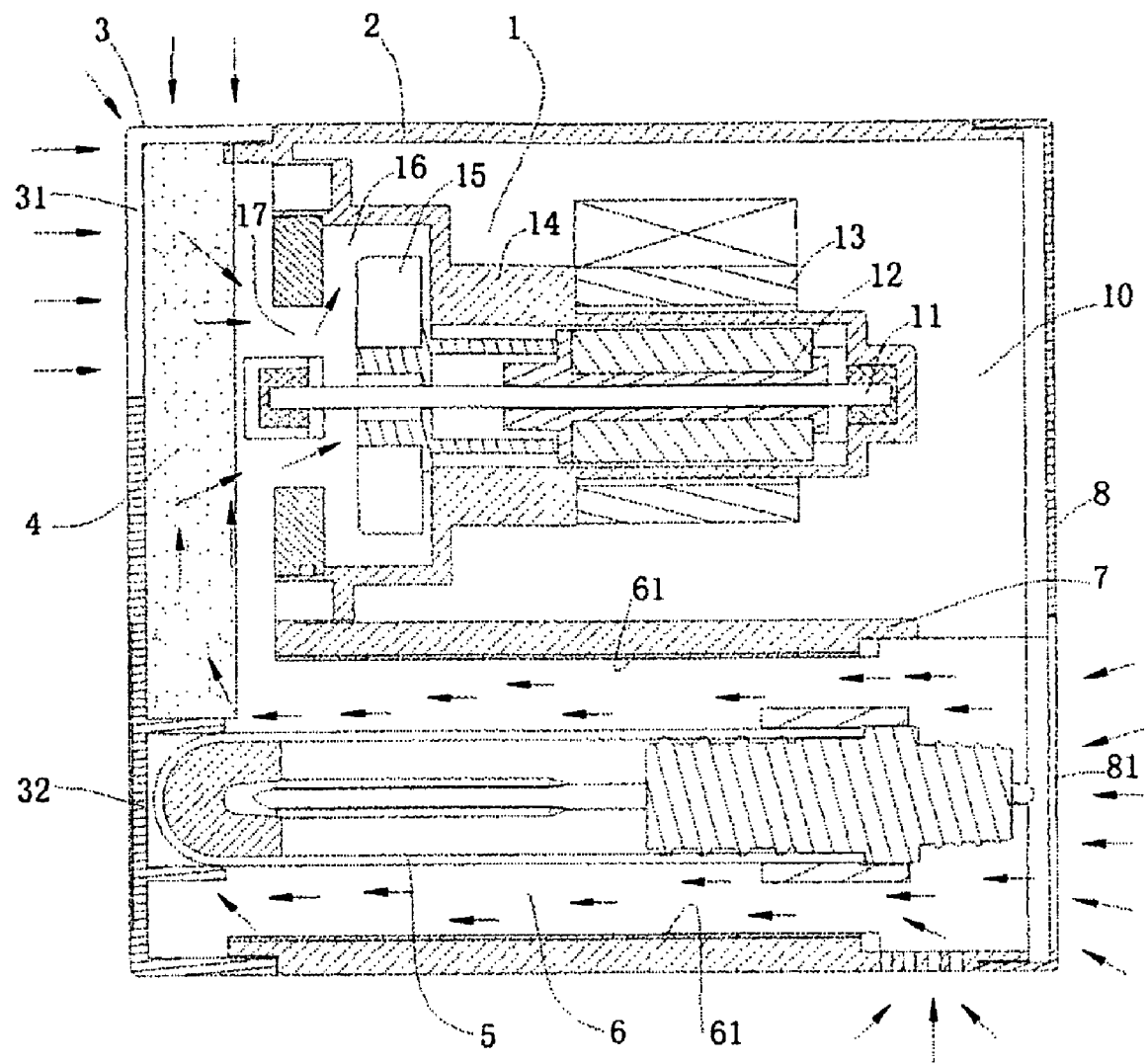
FIG. 1 is a landscape orientation sectional view of a submersible pump with UV sterilization device of the first embodiment of the present invention.
Figure 2:
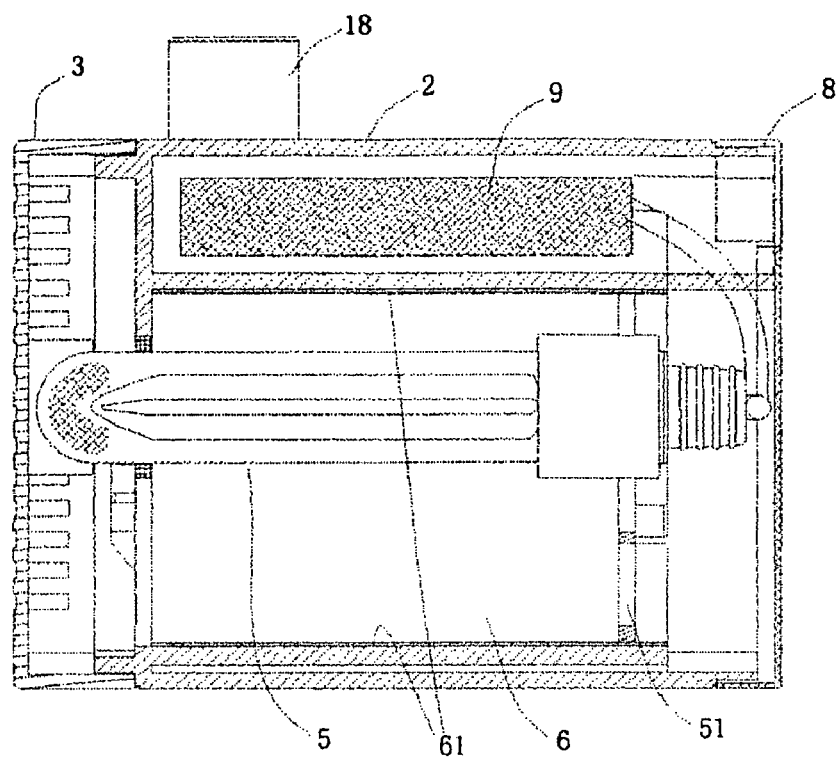
FIG. 2 is a longitudinal direction sectional view along the direction of the center line of the UV lamp of the first embodiment.
Figure 3:
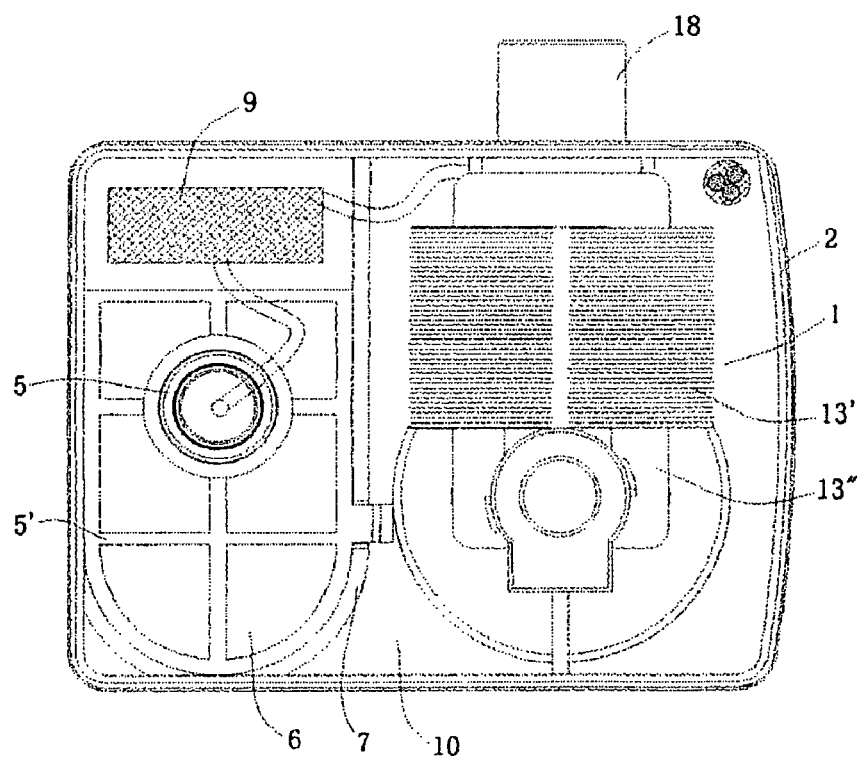
FIG. 3 is a structure schematic diagram of the first embodiment without the second end cap.

As shown in FIG. 1, FIG. 2 and FIG. 3, the submersible pump with UV sterilization device comprises a casing 2. A sterilization room 6 and a water pump room 10 are provided in the casing 2. The sterilization room 6 and the water pump room 10 are divided by a clapboard 7. A first end cap 3 and a second end cap 8 are separately fixed to the two ends of the casing 2. The position of the first end cap 3 corresponding to the water pump room 10 is provided with a front water inlet 31, and the second end cap 8 is provided with a back water inlet 81 connected to the water inlet of the sterilization room 6.

The submersible pump with UV sterilization device also comprises a water pump 1. The water pump 1 comprises a pump casing 14, a stator 13 fixed at the pump casing 14, a permanent-magnet rotor 12 fixed in the pump casing 14, and an impeller 15 in an impeller room 16 driven by the permanent-magnet rotor 12. Wherein, the permanent-magnet rotor 12 is fixed in the rotor containing cavity of the pump casing 14 through a rotating shaft 11, and the stator 13 comprises a stalloy 13' and a stator coil 13". The water pump 1 is fixed in the water pump room 10 of the casing 2. A water outlet 18 is provided upon the impeller room 16 of the water pump 1. Furthermore, the impeller room 16 has a water inlet 17 corresponding to the front water inlet 31 of the first end cap 3. A filter member 4 may also be fixed between the water inlet 17 of the impeller room 16 and the front water inlet 31 of the first end cap 3; the water outlet of the sterilization room 6 is connected to the impeller room 16 of the water pump 1. A reflection board 61 is fixed to the internal wall of the sterilization room 6. A cold cathode UV sterilization device 5 is fixed in the sterilization room 6, and the UV sterilization device 5 is connected to the output end of the inverter fixed in a containing cavity of the casing 2. When the submersible pump is working, one part of the water is transmitted from the back water inlet 81 of the second end cap 8 through ultraviolet irradiation of the sterilization room 6 into the impeller room 16 of the water pump 1, another part of the water is transmitted from the front water inlet 31 of the first end cap 3 directly or through the filter member 4 into the impeller room 16 to be mixed and pumped out there.

The front water inlet 31 of the first end cap 3 should be away from the water outlet of the sterilization room 6 as far as possible. The part 32 of the first end cap 3 corresponding to the end of the water outlet of the sterilization room 6 is a water barrier plane. The barrier plane transmits the water after ultraviolet sterilization in the sterilization room 6 into the impeller room 16, and then the water is mixed with the water from the front water inlet 31 of the first end cap 3 into the impeller room 16 and pumped out. To increase the dimension of the water barrier plane, the part 32 of the first end cap 3 corresponding to the end of the water outlet of the sterilization room 6 had better be designed as an arc structure bulging outwards, and the part of the front water inlet 31 of the first end cap 3 can also be designed as an arc structure bulging outwards.

The scale between the total area of all the back water inlets 81 of the second end cap 8 and the total area of all the front water inlets 31 of the first end cap 3 is from 10:90 to 50:50, so as to enable to adjust the flow rate of the water inflow needing sterilization from the back water inlet 81 of the second end cap 8.

The casing 2, the clapboard 7 in the casing 2 and the pump casing 14 of the water pump 1 may are a whole component made by incorporate injection moulding. The filter member 4 is polyurethanes filter cotton. The cold cathode UV sterilization device 5 is fixed in the middle of the sterilization room 6 by using the fixed yoke 5' and the first end cap 3, and the axes of the cold cathode UV lamp of the cold cathode UV sterilization device 5 is basically parallel to the direction of the water current in the sterilization room 6 of the casing 2.

Figure 4:
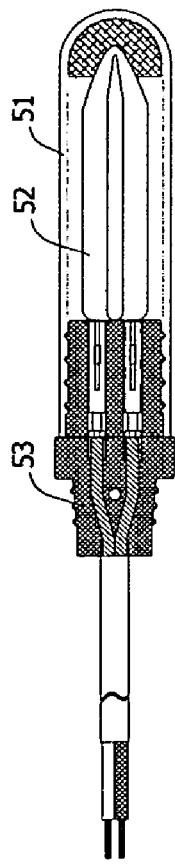
FIG. 4 is a structure schematic diagram of the UV sterilization device of the first embodiment.

Referring to FIG. 4, the cold cathode UV sterilization device 5 comprises a transparent glass tube 51, a cold cathode UV lamp 52 loaded in the glass tube 51, and a waterproof connector 53 inserted to the nozzle of the glass tube 51 and connected to the two electrodes of the cold cathode UV lamp 52. The cold cathode UV lamp 52 has a small volume, such as the overall dimension of a cold cathode UV lamp of 2.8 W is 45 mm×8 mm×4 mm, and of 5 W is 92 mm×8 mm×4 mm, and it also produces no heat when working and has a long useful life. According to the design requirement of the products, the cold cathode UV lamps can be chosen from 1 W-20 W.

Figure 5:
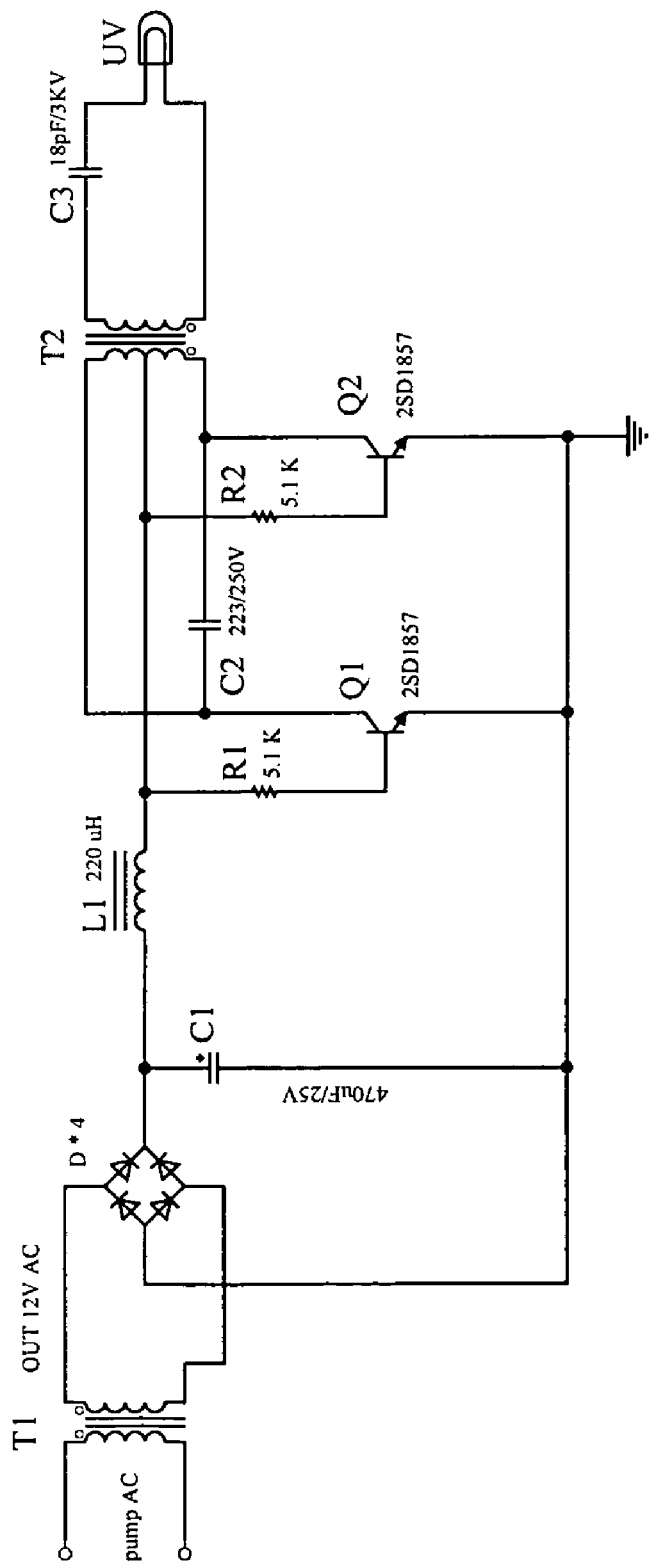
FIG. 5 is a circuit diagram of the control core of the first embodiment.

Referring to FIG. 5, the inverter comprises an oscillating circuit and a drive circuit, wherein the oscillating circuit is composed of a transformer T2, transistors Q1 and Q2, resistors R1 and R2, and a capacitor to C2; and the drive circuit is composed of the secondary winding of the transformer T2 and a capacitor C3. The core 9 of the inverter is sealed with waterproof glue, and is packed in the containing cavity of the casing 2. The core 9 can also be fixed in the water pump room 10.

Figure 6:
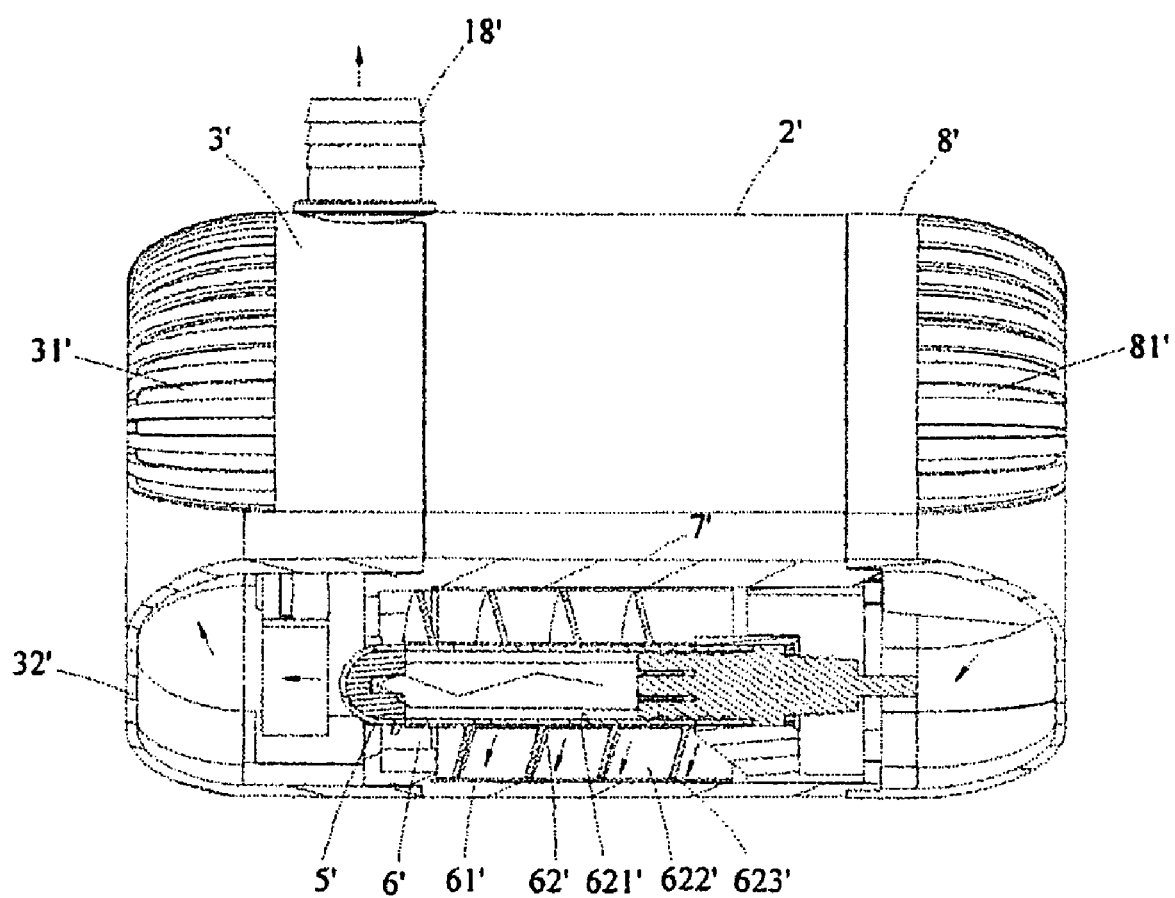
FIG. 6 is a structure schematic diagram of the second embodiment having two sterilization rooms.

According to the actual demand, the present invention can provide a submersible pump with multiple the sterilization rooms. The structure of the second embodiment having two sterilization rooms is shown in FIG. 6. In FIG. 6, two sterilization rooms 6' and a water pump room are provided in a casing 2'. The water pump room is in the top of the casing; the two sterilization rooms 6' are separately at the two sides below the water pump room; and among the three adjacent parts a clapboard 7' is fixed. At the two ends of the casing 2', a first end cap 3' and a second end cap 8' are separately fixed. The position of the first end cap 3' corresponding to the water pump room is provided with a front water inlet 31', and the second end cap 8' is provided with a back water inlet 81' connected to the water inlet of the two sterilization rooms. The water pump is fixed in the water pump room. A water outlet 18, is fixed above the impeller room of the water pump. The impeller room is connected to the two water outlets of the two sterilization rooms 6'. Both of the internal walls of the two sterilization rooms 6' are provided with a reflection board 61'. In each sterilization room 6' is provided with a cold cathode UV sterilization device 5'. The two cold cathode UV sterilization devices 5' are connected to the output end of an inverter fixed in the casing. The structure of other parts is as same as the first embodiment shown in FIG. 1, FIG. 2 and FIG. 3 and will be no more described.

To increase the distance of water flow in the sterilization room, to increase the time of the ultraviolet irradiation, a transparent spirality diversion component 62' can also be fixed in the sterilization room 6'. A through hole 621' is provided in the spirality diversion component 62', and spirality slots 622' are provided at the outside wall of the spirality diversion component 62'. The spirality diversion component 62' is fixed in the sterilization room 6' of the casing; the cold cathode UV sterilization device 5' is inserted into its through hole 621'; and its outside edge 623' contacts with the internal wall of the sterilization room 6' and the reflection board 61', to form a spirality water current passage in the sterilization room 6'; the water flows out along the spirality water current passage, increasing the time of the ultraviolet irradiation. The spirality diversion component 62' can be made with anti-ultraviolet transparent materials such as glass.

In FIG. 6, to form a larger water barrier plane, the part 32' of the first end cap 3' corresponding to the end of the water outlet of the sterilization room 6' is designed as an ac structure bulging outwards, and the part of the front water inlet 31 of the first end cap 3, can also be designed as an arc structure bulging outwards.

The present invention submersible pump especially is fit to be used in indoor and outdoor fountains or ponds. Its UV sterilization device is set in the sterilization room with a refection board, and has no hurts to the other objects and biology of the environments; the UV sterilization device is an individual component, easily to be changed. Otherwise, for the reflection board provided on the internal wall of the sterilization room, it can decrease the wastage of the ultraviolet light, increase the efficiency of sterilization and will do not hurt the plastic casing.

According to the present invention principle, the present invention can also provide a water filter with sterilization device for a pump or a drinking water machine, etc. The water filter with sterilization device comprises said cold cathode UV sterilization device, said inverter, a filter member, and a casing with a water inlet and a water outlet. When working, the water flow within the casing is exposed to ultraviolet irradiation and is disinfected as a result.

What is claimed is:

1. A submersible pump with UV sterilization device comprising:
   a casing, at least one sterilization room and one water pump room being provided in the casing, a first end cap and a second end cap being separately fixed at two ends of the casing, a front water inlet being provided at the position of the first end cap corresponding to the water pump room, a back water inlet connected to a water inlet of the sterilization room being provided at the second end cap, and a reflection board being provided at an internal wall of the sterilization room;
   a water pump, the water pump comprising a pump casing, a stator fixed at the pump casing, a permanent-magnet rotor fixed in the pump casing, and an impeller in an impeller room driven by the permanent-magnet rotor, the water pump being provided in the water pump room of the casing, a water outlet being provided above a impeller room of the water pump, and the impeller room being connected to a water outlet of the sterilization room;
   an inverter, the inverter being provided in a containing cavity in the casing; and
   a cold cathode UV sterilization device, the cold cathode UV sterilization device being fixed in the sterilization room of the casing and connected to an output end of the inverter;
   when working, one part of the water being transmitted from the back water inlet of the second end cap into the sterilization room to execute ultraviolet irradiation, the water flow executed ultraviolet irradiation being transmitted from the water outlet of the sterilization room into the impeller room of the water pump and then being mixed and pumped out with another part of the water transmitted from the front water inlet of the first end cap into the impeller room.

2. The submersible pump with UV sterilization device of claim 1, wherein the submersible pump further comprises a transparent spirality diversion component; a through hole is provided in the spirality diversion component, and spirality slots are provided at an outside wall of the spirality diversion component; and the spirality diversion component is fixed in the sterilization room of the casing, the cold cathode UV sterilization device is inserted into the through hole, and an outside edge of the spirality diversion component is contacted to the internal wall of the sterilization room and the reflection board, to form a spirality water current passage in the sterilization room, for increasing the time of the ultraviolet irradiation.

3. The submersible pump with UV sterilization device of claim 2, wherein the cold cathode UV sterilization device comprises a transparent glass tube, a cold cathode UV lamp loaded in the glass tube, and a waterproof connector inserted to a nozzle of the glass tube and connected to two electrodes of the cold cathode UV lamp.

4. The submersible pump with UV sterilization device of claim 1, wherein the cold cathode UV sterilization device comprises a transparent glass tube, a cold cathode UV lamp loaded in the glass tube, and a waterproof connector inserted to a nozzle of the glass tube and connected to two electrodes of the cold cathode UV lamp.

5. The submersible pump with UV sterilization device of claim 1, wherein the front water inlet of the first end cap should be away from the water outlet of the sterilization room as far as possible; a part of the first end cap corresponding to the end of the water outlet of the sterilization room is a water barrier plane; the water barrier plane transmits the water after ultraviolet sterilization in the sterilization room into the impeller room of the water pump, and then the water is mixed and pumped out with the water from the front water inlet of the first end cap into the impeller room.

6. The submersible pump with UV sterilization device of claim 5, wherein a part of the front water inlet of the first end cap is an arc structure bulging outwards, and the part of the first end cap corresponding to a end of the water outlet of the sterilization room is an arc structure bulging outwards.

7. The submersible pump with UV sterilization device of claim 1, wherein a filter member is provided between a water inlet of the impeller room of the water pump and the front water inlet of the first end cap.

8. The submersible pump with UV sterilization device of claim 1, wherein a scale between a total area of all back water inlets of the second end cap and a total area of all front water inlets of the first end cap is from 10:90 to 50:50.

9. The submersible pump with UV sterilization device of claim 1, wherein the casing, and the pump casing of the water pump in the casing are a whole component made by incorporate injection moulding.

10. The submersible pump with UV sterilization device of claim 9, wherein a part of the front water inlet of the first end cap is an arc structure bulging outwards, and a part of the first end cap corresponding to a end of the water outlet of the sterilization room is an arc structure bulging outwards; and a scale between a total area of all back water inlets of the second end cap and a total area of all front water inlets of the first end cap is from 10:90 to 50:50.

11. The submersible pump with UV sterilization device of claim 10, wherein the submersible pump further comprises a transparent spirality diversion component; a through hole is provided in the spirality diversion component, and spirality slots are provided at an outside wall of the spirality diversion component; and the spirality diversion component is fixed in the sterilization room of the casing, the cold cathode UV sterilization device is inserted into the through hole, and an outside edge of the spirality diversion component is contacted to an internal wall of the sterilization room and the reflection board, to form a spirality water current passage in the sterilization room.

12. The submersible pump with UV sterilization device of claim 11, wherein the cold cathode UV sterilization device comprises a transparent glass tube, a cold cathode UV lamp loaded in the glass tube, and a waterproof connector inserted to a nozzle of the glass tube and connected to two electrodes of the cold cathode UV lamp.

13. The submersible pump with UV sterilization device of claim 1, wherein two sterilization rooms and a water pump room are fixed in the casing; the water pump room is in the top of the casing; the two sterilization rooms are separately at two sides below the water pump room; and among three adjacent parts a clapboard is provided; at the two ends of the casing, a first end cap and a second end cap are separately fixed; the position of the first end cap corresponding to the water pump room is provided with a front water inlet, and the second end cap is provided with a back water inlet connected to the water inlet of the two sterilization rooms.

* * * * *